United States Patent
Wang et al.

(10) Patent No.: US 8,325,313 B2
(45) Date of Patent: Dec. 4, 2012

(54) CAMBERED LIQUID CRYSTAL DISPLAY PANEL

(75) Inventors: Shu-Chih Wang, Taipei (TW); Yu-Chen Liu, Taipei (TW); Che-Yao Wu, Changhua County (TW); Wei-Yi Chien, Keelung (TW)

(73) Assignee: Au Optronics Corporation, Hsinchu (TW)

( * ) Notice: Subject to any disclaimer, the term of this patent is extended or adjusted under 35 U.S.C. 154(b) by 517 days.

(21) Appl. No.: 12/506,265

(22) Filed: Jul. 21, 2009

(65) Prior Publication Data

US 2010/0289996 A1 Nov. 18, 2010

(30) Foreign Application Priority Data

May 18, 2009 (TW) .............................. 98116404 A (51) Int. Cl.
  *G02F 1/1339* (2006.01)
(52) U.S. Cl. .................... 349/155; 349/156; 349/157
(58) Field of Classification Search ........... 349/155–157
  See application file for complete search history.

(56) References Cited

U.S. PATENT DOCUMENTS

| 7,253,868 | B2 | 8/2007 | Lee et al. | |
| 7,286,204 | B2 | 10/2007 | Yang et al. | |
| 7,923,080 | B2* | 4/2011 | Ebisu et al. | 428/1.55 |
| 8,049,859 | B2* | 11/2011 | Watanabe et al. | 349/156 |
| 2002/0027636 | A1 | 3/2002 | Yamada | |
| 2006/0244894 | A1* | 11/2006 | Yoon | 349/155 |
| 2009/0174832 | A1* | 7/2009 | Lee | 349/43 |
| 2009/0273749 | A1* | 11/2009 | Miyamoto et al. | 349/114 |

FOREIGN PATENT DOCUMENTS

| TW | I234031 | 6/2005 |
| TW | 200521538 | 7/2005 |
| TW | I260431 | 8/2006 |

OTHER PUBLICATIONS

"1st Office Action of China Counterpart Application", issued on Apr. 6, 2010, pp. 1-4.
"Office Action of Taiwan Counterpart Application", issued on Sep. 14, 2012, p1-p13, in which the listed reference was cited.

* cited by examiner

*Primary Examiner* — Huyen Ngo
(74) *Attorney, Agent, or Firm* — Jianq Chyun IP Office (57) ABSTRACT

A cambered liquid crystal display including a first substrate, a second substrate, a sealant, a plurality of photo-spacers and a liquid crystal layer is provided. The sealant is disposed between the first substrate and the second substrate, wherein the first substrate, the second substrate and the sealant are bent to form at least one cambered structure. The photo-spacers are disposed on the first substrate and distributed between the first and the second substrate, wherein a gap formed between a part of the photo-spacers close to the top of the cambered structure and the second substrate is smaller than a gap formed between a part of the photo-spacers apart from the top of the cambered structure and the second substrate. The liquid crystal layer is disposed between the first and the second substrate, wherein the photo-spacers and the liquid crystal layer are surrounded by the sealant.

13 Claims, 13 Drawing Sheets

CAMBERED LIQUID CRYSTAL DISPLAY PANEL

CROSS-REFERENCE TO RELATED APPLICATION

This application claims the priority benefit of Taiwan application serial no. 98116404, filed on May 18, 2009. The entirety of the above-mentioned patent application is hereby incorporated by reference herein and made a part of specification.

BACKGROUND OF THE INVENTION

1. Field of the Invention

The present invention relates to a cambered liquid crystal display panel. More particularly, the present invention relates to a cambered liquid crystal display panel that photo-spacers therein may have different distribution densities or different gaps can be formed between the photo-spacers and opposite substrate.

2. Description of Related Art

Generally, a liquid crystal display (LCD) panel used in a LCD apparatus includes an active array substrate, a color filter substrate and a liquid crystal layer disposed there between, wherein the two substrates are generally bonded by a sealant to seal the liquid crystal layer there between. To maintain a cell gap between the two substrates, photo-spacers are generally formed on the active array substrate or the color filter substrate, and then the active array substrate and the color filter substrate are assembled and liquid crystal is filled there between to form the LCD panel. To ensure a display quality of the LCD apparatus, maintenance of the cell gap is a very important issue, and if uniformity of the cell gap is not properly maintained, a display mura phenomenon is occurred.

Recently, cambered LCD panels are applied to electronic products having a cambered appearance, and in the cambered LCD panel, variation of the cell gap is one of the concerned issues during fabrication.

Figure 1:
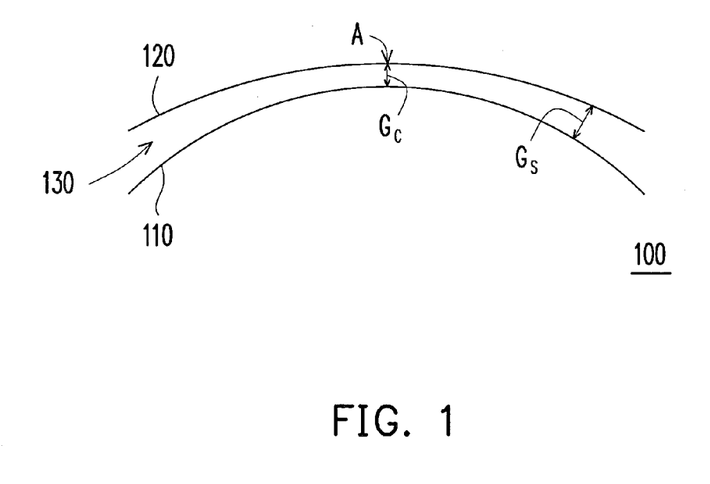
FIG. 1 is a cross-sectional view of a conventional cambered LCD panel.

FIG. 1 is a cross-sectional view of a conventional cambered LCD panel. Referring to FIG. 1, the conventional cambered LCD panel 100 is formed by a first substrate 110, a second substrate 120, a sealant (not shown) and a liquid crystal layer 130, wherein a cell gap Gc close to a top A of a cambered structure is less than a cell gap Gs apart from the top A of the cambered structure, so that liquid crystal molecules in the liquid crystal layer 130 are pushed apart from the top A of the cambered structure, which may lead to uneven distribution of the liquid crystal molecules and cause the display mura, and accordingly the display quality of the LCD panel is deteriorated. Therefore, the above-mentioned problem is one of the major problems to be resolved for fabricating the cambered LCD panel.

SUMMARY OF THE INVENTION

The present invention is directed to a cambered liquid crystal display (LCD) panel capable of maintaining a cell gap through adjusting gaps between photo-spacers and opposite substrate or adjusting a distribution density of the photo-spacers.

The present invention provides a cambered LCD panel including a first substrate, a second substrate, a sealant, a plurality of photo-spacers and a liquid crystal layer. The sealant is disposed between the first substrate and the second substrate, and the first substrate, the second substrate and the sealant are bent to form at least one cambered structure. The photo-spacers are disposed on the first substrate and distributed between the first and the second substrate, wherein a gap formed between a part of the photo-spacers close to a top of the cambered structure and the second substrate is smaller than a gap formed between a part of the photo-spacers apart from the top of the cambered structure and the second substrate. The liquid crystal layer is disposed between the first substrate and the second substrate, wherein the photo-spacers and the liquid crystal layer are surrounded by the sealant.

In an embodiment of the present invention, the first substrate has a first region corresponding to the top of the cambered structure and at least a second region located at one side of the first region. The photo-spacers include a plurality of first photo-spacers and a plurality of second photo-spacers, wherein the first photo-spacers are disposed in the first region, and a gap between each of the first photo-spacers and the second substrate is G1. The second photo-spacers are disposed in the second region, and a gap between each of the second photo-spacers and the second substrate is G2, wherein G1<G2.

In an embodiment of the present invention, the first substrate further has at least one third region located at another side of the first region, and the photo-spacers further include a plurality of third photo-spacers disposed in the third region. A gap between each of the third photo-spacers and the second substrate is G3, wherein G1<G3.

The present invention provides a cambered LCD panel including a first substrate, a second substrate, a sealant, a plurality of photo-spacers and a liquid crystal layer. The sealant is disposed between the first substrate and the second substrate, and the first substrate, the second substrate and the sealant are bent to form at least one cambered structure. The photo-spacers are disposed on the first substrate and distributed between the first and the second substrate, wherein a distribution density of a part of the photo-spacers close to a top of the cambered structure is greater than a distribution density of a part of the photo-spacers apart from the top of the cambered structure. The liquid crystal layer is disposed between the first substrate and the second substrate, wherein the photo-spacers and the liquid crystal layer are surrounded by the sealant.

In an embodiment of the present invention, the first substrate has a first region corresponding to the top of the cambered structure and at least a second region located at one side of the first region. The photo-spacers include a plurality of first photo-spacers and a plurality of second photo-spacers, wherein the first photo-spacers are disposed in the first region, and a distribution density of each of the first photo-spacers is D1. The second photo-spacers are disposed in the second region, and a distribution density of each of the second photo-spacers is D2, wherein |D1/D2| is between about 1.125 and about 20.

In an embodiment of the present invention, the first substrate further has at least one third region located at another side of the first region, and the photo-spacers further include a plurality of third photo-spacers disposed in the third region. A distribution density of each of the third photo-spacers is D3, wherein D1>D3, and |D1/D3| is between about 1.125 and about 20.

As described above, by adjusting the gaps between the photo-spacers and the opposite substrate, a gap between the photo-spacers close to the top of the cambered structure and the opposite substrate is adjusted to be smaller than a gap between the photo-spacers apart from the top of the cambered structure and the opposite substrate, so as to maintain the cell gap of the cambered LCD panel. In the present invention, by adjusting the distribution densities of the photo-spacers, a distribution density of the photo-spacers close to the top of the cambered structure is adjusted to be higher than a distribution density of the photo-spacers apart from the top of the cambered structure, so that the cell gap of the cambered LCD panel can also be maintained.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2H to FIG. 2J are amplified diagrams respectively illustrating a bended cambered LCD panel according to an embodiment of the present invention.

DESCRIPTION OF THE EMBODIMENTS

Figure 2A:
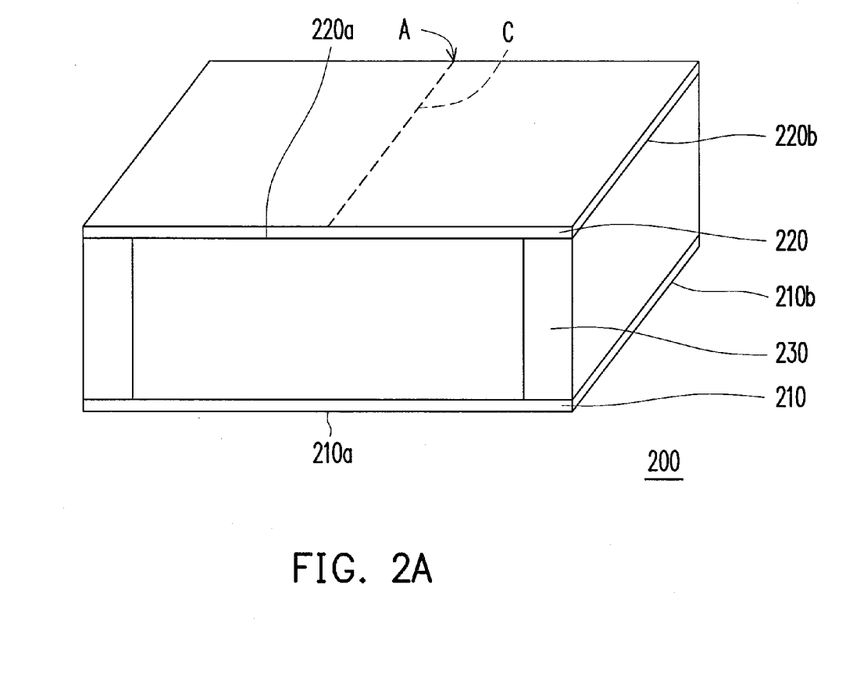
FIG. 2A is a cross-sectional view of a cambered LCD panel according to an embodiment of the present invention.
Figure 2B:
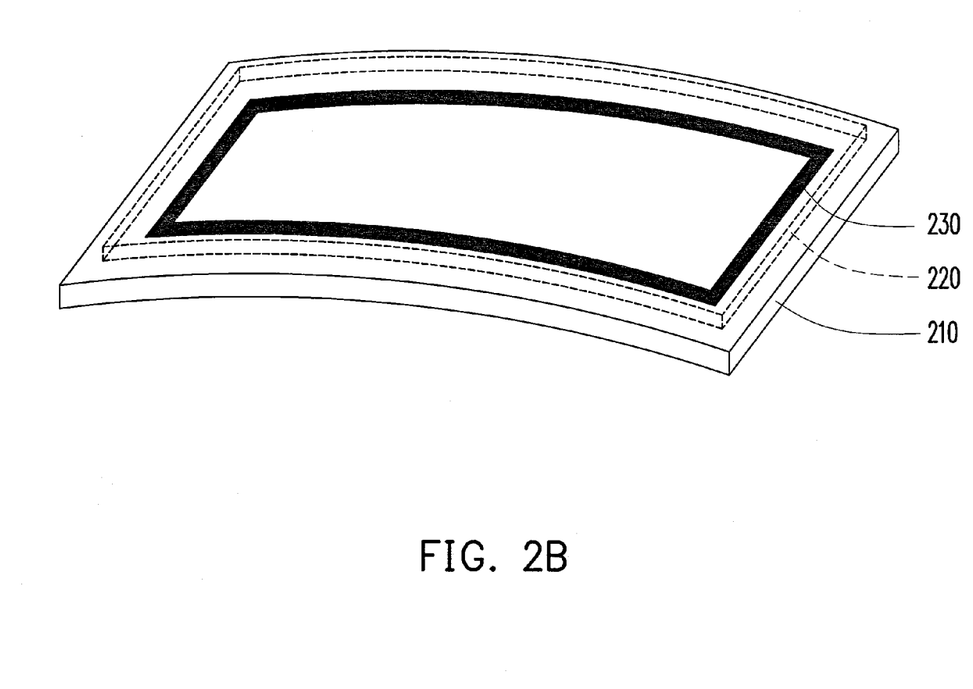
FIG. 2B is a perspective view of FIG. 2A.
Figure 2C:
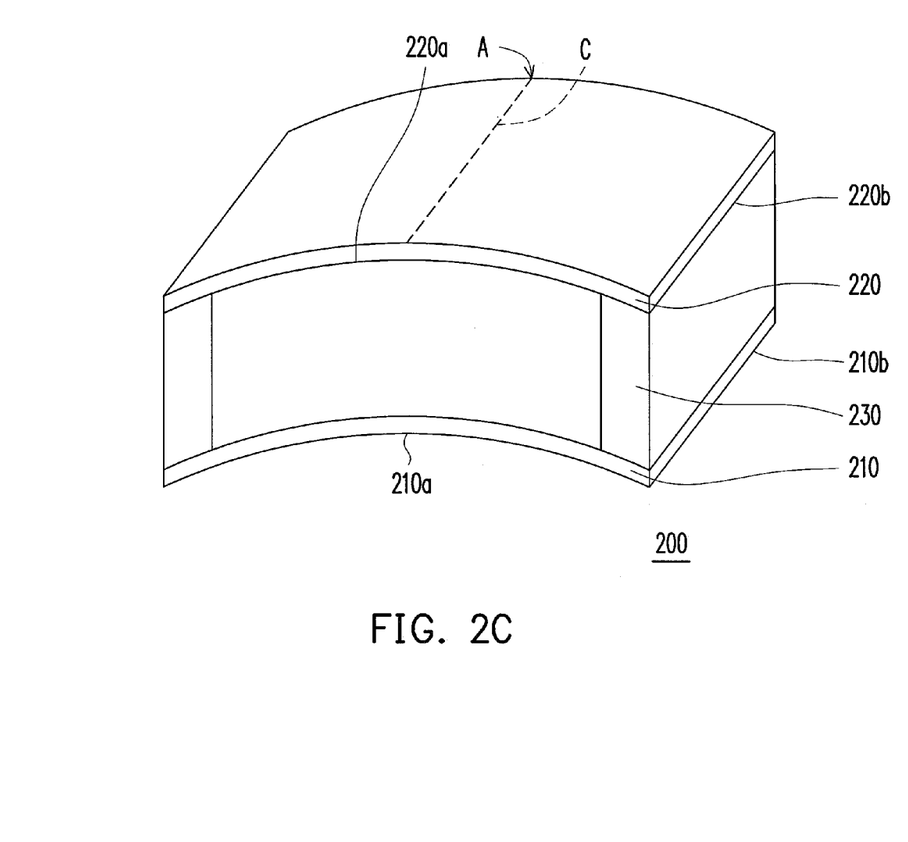
FIG. 2C and FIG. 2C' respectively illustrate different bended structures of FIG. 2A.

FIG. 2A is a cross-sectional view of a cambered liquid crystal display (LCD) panel according to an embodiment of the present invention. FIG. 2B is a perspective view of FIG. 2A. FIG. 2C illustrates a bended structure of FIG. 2A. Referring to FIG. 2A and FIG. 2B, the cambered LCD panel 200 includes a first substrate 210, a second substrate 220, a sealant 230, a plurality of photo-spacers 240 and a liquid crystal layer 250. In detail, one layer or multiple layers of thin-film deposition (for example, an insulation layer, a protrusion, a metal layer or an alignment layer, etc.) can be disposed on the first substrate 210 and the second substrate 220, though the present invention is not limited thereto. For example, the first substrate 210 of the present embodiment is a transistor array substrate including a glass substrate, a transistor array layer, a planarization layer, a common electrode layer, protrusions and/or an alignment layer. The second substrate 220 is a color filter substrate including a glass substrate, a color filter layer, a passivation layer, protrusions and/or an alignment layer, etc. In another embodiment, the first substrate 210 is a color filter substrate, and the second substrate 220 is a transistor array substrate.

Certainly, patterns of the first substrate 210 and the second substrate 220 are not limited by the present invention. For example, the first substrate 210 can also be an array on color filter substrate (AOC substrate), or a color filter on array substrate (COA substrate). Besides, materials of the first substrate 210 and the second substrate 220 are not limited by the present invention. For example, the material of the substrate can be glass, quartz, polyester, polycarbonate-type or other suitable materials.

As described above, in the cambered LCD panel 200, the sealant 230 is disposed between the first substrate 210 and the second substrate 220, wherein the first substrate 210, the second substrate 220 and the sealant 230 are bent to form at least one cambered structure, as that shown in FIG. 2B. Besides, the first substrate 210 has a pair of first long sides 210a and a pair of first short sides 210b, and the second substrate 220 also has a pair of second long sides 220a and a pair of second short sides 220b. Particularly, the first long sides 210a are located opposite to the second long sides 220a, and the first short sides 210b are located opposite to the second short sides 220b, as that shown in FIG. 2A.

After the cambered LCD panel 200 is bent, the first long sides 210a and the second long sides 220a are arc-shaped, and the first short sides 210b and the second short sides 220b are linear, as that shown in FIG. 2C. Namely, the first substrate 210 and the second substrate 220 are bent along a direction of the long side. In other possible embodiments, after the cambered LCD panel 200 is bent, the first long sides 210a and the second long sides 220a are linear, and the first short sides 210b and the second short sides 220b are arc-shaped. Namely, the first substrate 210 and the second substrate 220 are bent along a direction of the short side.

In the present embodiment, when the first substrate 210, the second substrate 220 and the sealant 230 are bent to form the cambered structure, a top A of the cambered structure is located on a central line C of the cambered LCD panel 200. Namely, the top A of the cambered structure is located at a center of the structure.

Figure 2D:
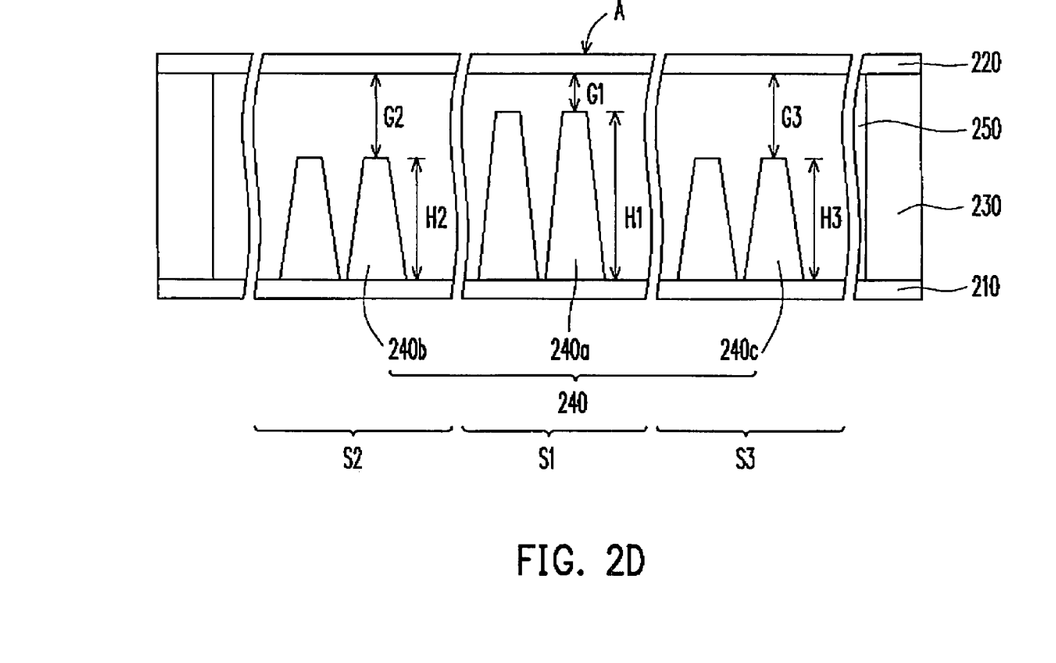
FIG. 2D is a partial amplified diagram of FIG. 2A.
Figure 2E:
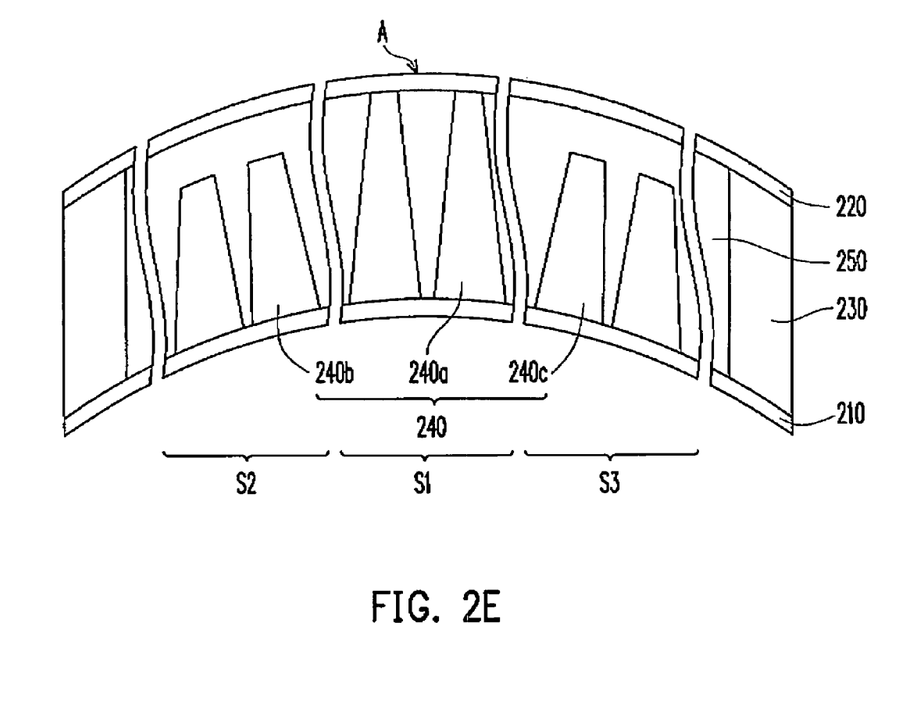
FIG. 2E illustrates a bended structure of FIG. 2D.

FIG. 2D is a partial amplified diagram of FIG. 2A, and FIG. 2E illustrates a bended structure of FIG. 2D. Referring to FIG. 2D, as described above, the photo-spacers 240 are disposed on the first substrate 210 and distributed between the first substrate 210 and the second substrate 220. It should be noticed that the first substrate 210 is located below the second substrate 220, and the photo-spacers 240 on the first substrate 210 extend upwards. In other possible embodiment, the first substrate 210 can be located above the second substrate 220, and the photo-spacers 240 on the first substrate 210 extend downwards.

A gap G1 formed between photo-spacers 240a close to the top A of the cambered structure and the second substrate 220 is smaller than gaps G2 and G3 respectively formed between photo-spacers 240b and 240c apart from the top A of the cambered structure and the second substrate 220, as that shown in FIG. 2D.

When the cambered LCD panel 200 is bent, since the gap G1 formed between the photo-spacers 240a close to the top A of the cambered structure and the second substrate 220 is relatively small, it can first confront cell gap variation of a region around the top A of the cambered structure, so as to maintain a consistency of the cell gap of the cambered LCD panel 200, as that shown in FIG. 2E. For a further emphasis, the gap G1 formed between the first photo-spacers 240a and the second substrate 220 refers to the cell gap, i.e. refers to a space formed between the first photo-spacers 240a and the second substrate 220 that contains the liquid crystal molecules. Moreover, it should be noticed that the photo-spacers 240 with different heights are, for example, fabricated according to a half-tone mask fabrication process.

In the present embodiment, the first substrate 210 has a first region S1 corresponding to the top A of the cambered structure and at least a second region S2 located at one side of the first region S1. The photo-spacers 240 include a plurality of the first photo-spacers 240a and a plurality of the second photo-spacers 240b, wherein the first photo-spacers 240a are disposed in the first region S1, and a gap between each of the first photo-spacers 240a and the second substrate 220 is G1. The second photo-spacers 240b are disposed in the second region S2, and a gap between each of the second photo-spacers 240b and the second substrate 220 is G2, wherein G1<G2. For a further emphasis, the gaps G1 and G2 respectively formed between the first photo-spacers 240a, the second photo-spacers 240b and the second substrate 220 refer to the cell gaps, i.e. refer to the spaces formed between the first photo-spacers 240a, the second photo-spacers 240b and the second substrate 220 that contains the liquid crystal molecules.

In the present embodiment, about 0.15 micrometer $\leq$|G1−G1|$\leq$ about 8 micrometers, and preferably about 0.2 micrometer $\leq$|G1−G2|$\leq$ about 2.5 micrometers. It should be noticed that a width of the first region S1 is determined according to a demand of an actual product.

In the present embodiment, the first substrate 210 further has at least one third region S3 located at another side of the first region S1, and the photo-spacers 240 further includes a plurality of third photo-spacers 240c disposed in the third region. S3. A gap between each of the third photo-spacers 240c and the second substrate 220 is G3, wherein G1<G3. The gaps G1, G2 and G3 respectively formed between the first photo-spacers 240a, the second photo-spacers 240b, the third photo-spacers 240c and the second substrate 220 refer to the cell gaps, i.e. refer to the spaces formed between the first photo-spacers 240a, the second photo-spacers 240b, the third photo-spacers 240c and the second substrate 220 that contains the liquid crystal molecules.

Moreover, in the present embodiment, about 0.15 micrometer $\leq$|G1−G3|$\leq$ about 8 micrometers, and preferably about 0.2 micrometer $\leq$|G1−G3|$\leq$ about 2.5 micrometers. It should be noticed that the gap G3 formed between the third photo-spacers 240c and the second substrate 220 can be equal or unequal to the gap G2 formed between the second photo-spacers 240b and the second substrate 220. If the gap G3 is equal to the gap G2 as that shown in FIG. 2D, the second region S2 and the third region S3 located at two sides of the first region S1 are symmetrically distributed. If the gap G3 is not equal to the gap G2, the second region S2 and the third region S3 located at two sides of the first region S1 are asymmetrically distributed.

For a further emphasis, the gaps G1, G2 and G3 respectively formed between the first photo-spacers 240a, the second photo-spacers 240b, the third photo-spacers 240c and the second substrate 220 can be respectively contributed by heights of the first photo-spacer 240a, the second photo-spacer 240b and the third photo-spacer 240c, and/or a thickness of the first substrate 210 and a height of thin-film depositions thereon or a height of a protrusion thereon, and/or a thickness of the second substrate 220 and a height of thin-film depositions thereon or a height of a protrusion thereon.

In the present embodiment, the gaps G1, G2 and G3 respectively formed between the first photo-spacers 240a, the second photo-spacers 240b, the third photo-spacers 240c and the second substrate 220 are respectively contributed by the heights H1, H2 and H3 of the first photo-spacer 240a, the second photo-spacer 240b and the third photo-spacer 240c as that shown in FIG. 2D. In detail, the height of each of the first photo-spacers 240a is H1, and the height of each of the second photo-spacers 240b is H2, wherein H1>H2. In the present embodiment, about 0.15 micrometer $\leq$|H1−H2|$\leq$ about 8 micrometers, and preferably about 0.2 micrometer $\leq$|H1−H2|$\leq$ about 2.5 micrometers. Moreover, in the present embodiment, the height of each of the third photo-spacers 240c is H3, wherein H1>H3. In the present embodiment, about 0.15 micrometer $\leq$|H1−H3|$\leq$ about 8 micrometers, and preferably about 0.2 micrometer $\leq$|H1−H3|$\leq$ about 2.5 micrometers.

In addition, the heights H1, H2 and H3 of the first photo-spacer 240a, the second photo-spacer 240b and the third photo-spacer 240c can be respectively formed by stacking different film layers and/or protrusions on the first substrate 210. In detail, the different film layers and/or protrusions on the first substrate 210 can be located under the first photo-spacers 240a, the second photo-spacers 240b and the third photo-spacers 240c or can be located above the first photo-spacers 240a, the second photo-spacers 240b and the third photo-spacers 240c, or can be simultaneously located under and above the first photo-spacers 240a, the second photo-spacers 240b and the third photo-spacers 240c.

It should be noticed that when a number of the second regions S2 is greater than two, in the second region S2 close to the first region S1, the height H2 of the second photo-spacer 240b is relatively high. Conversely, in the second region S2 apart from the first region S1, the height H2 of the second photo-spacer 240b is relatively small. Similarly, when a number of the third regions S3 is greater than two, in the third region S3 close to the first region S1, the height H3 of the third photo-spacer 240c is relatively high. Conversely, in the third region S3 apart from the first region S1, the height H3 of the third photo-spacer 240c is relatively small.

Figure 2F:
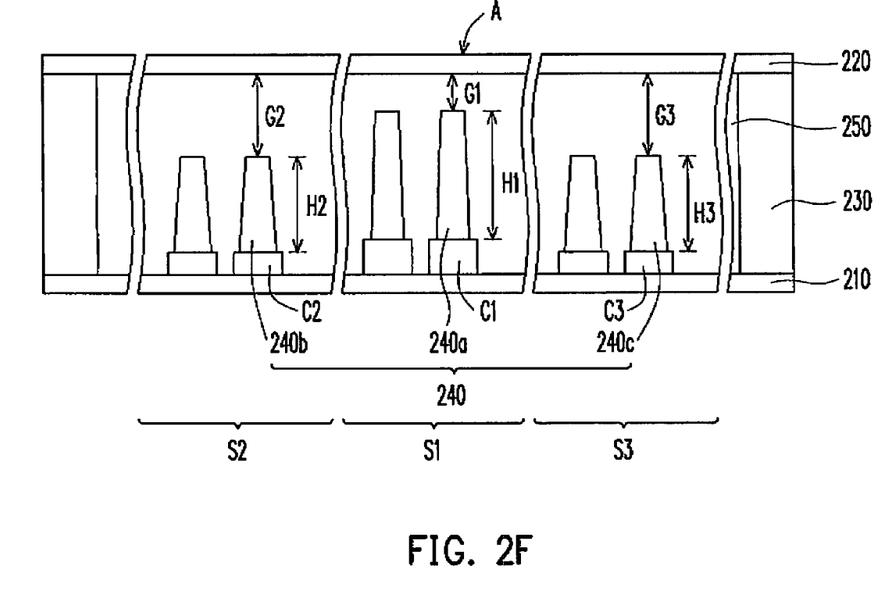
FIG. 2F and FIG. 2G are respectively an amplified cross-sectional view of a cambered LCD panel according to an embodiment of the present invention.

FIG. 2F and FIG. 2G are respectively an amplified cross-sectional view of a cambered LCD panel according to an embodiment of the present invention. Referring to FIG. 2F, the cambered LCD panel of the present embodiment is similar to that of FIG. 2D, and a difference there between is that the heights of the first photo-spacer 240a, the second photo-spacer 240b and the third photo-spacer 240c satisfy an equation of H1>H2=H3, and the gaps G1, G2 and G3 respectively formed between the first photo-spacers 240a, the second photo-spacers 240b, the third photo-spacers 240c and the second substrate 220 are respectively contributed by the thickness of the first substrate 210 and heights of protrusions C1, C2 and C3 thereon, wherein G1<G2=G3, as that shown in FIG. 2F.

Figure 2G:
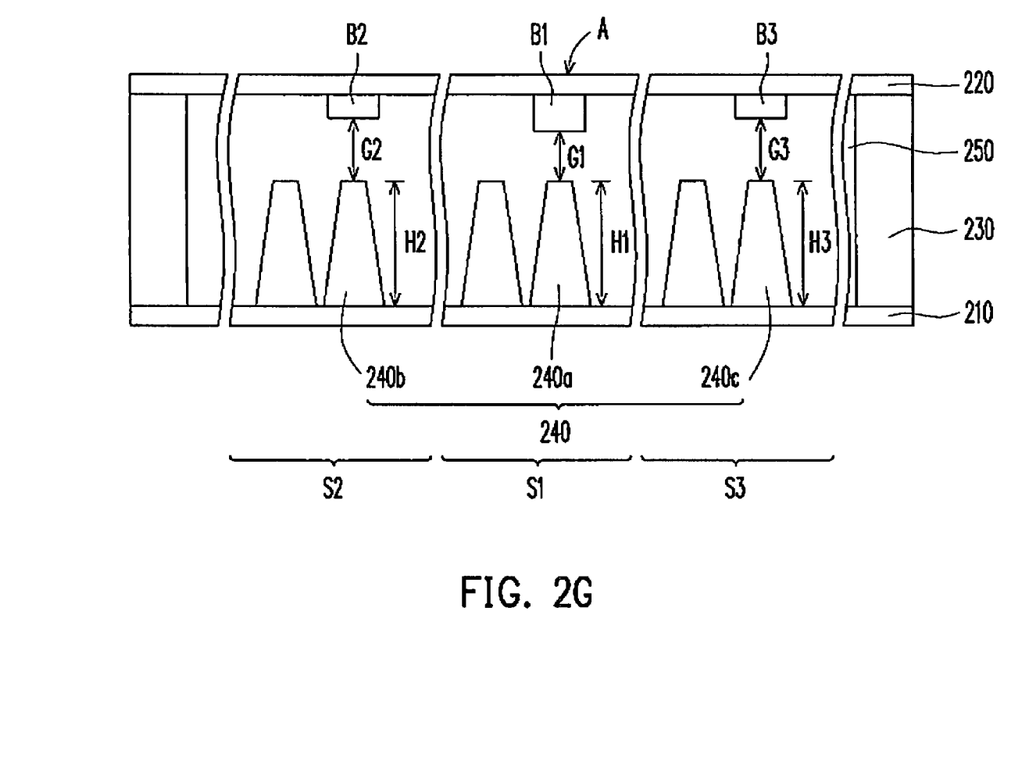

Referring to FIG. 2G, the cambered LCD panel of the present embodiment is similar to that of FIG. 2D, and a difference there between is that the heights of the first photo-spacer 240a, the second photo-spacer 240b and the third photo-spacer 240c satisfy an equation of H1=H2=H3, and the gaps G1, G2 and G3 respectively formed between the first photo-spacers 240a, the second photo-spacers 240b, the third photo-spacers 240c and the second substrate 220 are respectively contributed by the thickness of the second substrate 220 and heights of protrusions B1, B2 and B3 thereon, wherein G1<G2=G3, as that shown in FIG. 2G.

As described above, in FIG. 2F and FIG. 2G, the liquid crystal layer 250 is also located between the first substrate 210 and the second substrate 220, wherein the photo-spacers 240 and the liquid crystal layer 250 are also surrounded by the sealant 230. It should be noticed that the cell gap formed between the first substrate 210 and the second substrate 220 is between about 2-about 6 micrometers, and preferably between about 3-about 5 micrometers. For a further emphasis, the cell gap herein refers to a thickness of a space formed between the first substrate 210 and the second substrate 220 that contains the liquid crystal layer 250.

Figure 2H:
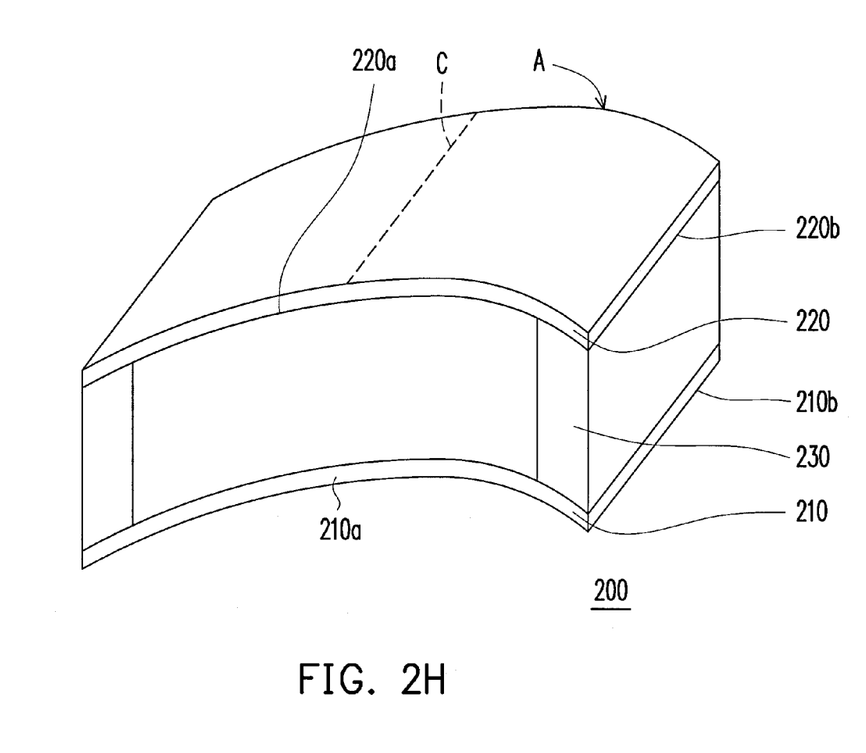
Figure 2J:
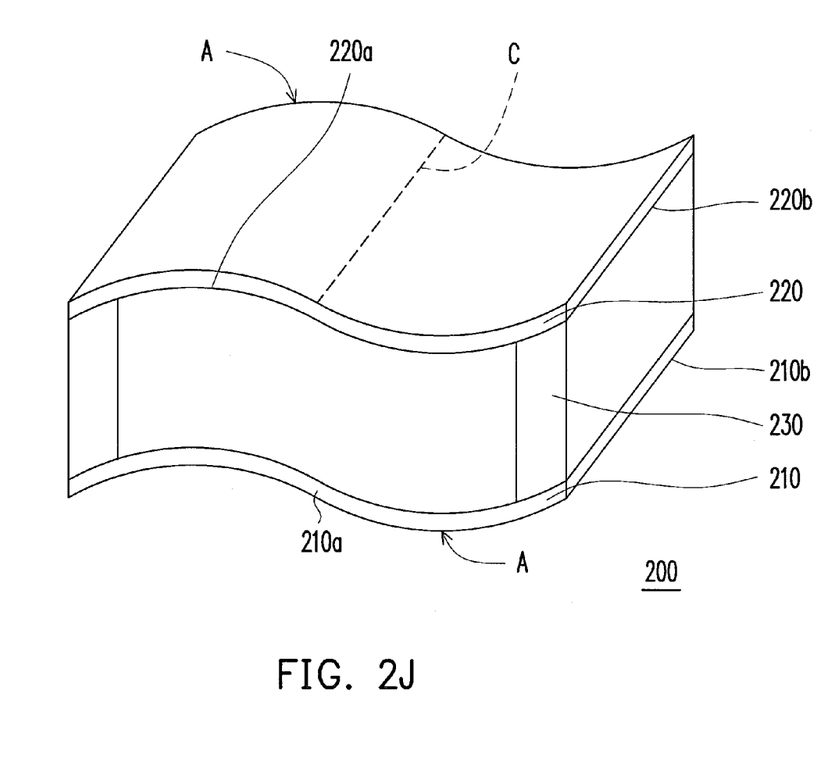

FIG. 2H to FIG. 2J are amplified diagrams respectively illustrating a bended cambered LCD panel according to an embodiment of the present invention. It should be noticed that the top A of the cambered structure formed by bending the first substrate 210, the second substrate and the sealant 230 is unnecessarily located on the central line C of the cambered LCD panel, but can be located at any side of the central line C. Namely, the top A of the cambered structure is located at the right side of the structure as that shown in FIG. 2H, or is located at the left side of the structure as that shown in FIG. 2I. Moreover, a number of the top A of the cambered structure is unnecessarily to be one. In detail, the first substrate 210, the second substrate and the sealant 230 can be bent to form two or more cambered structures, as that shown in FIG. 2J.

Figure 3:
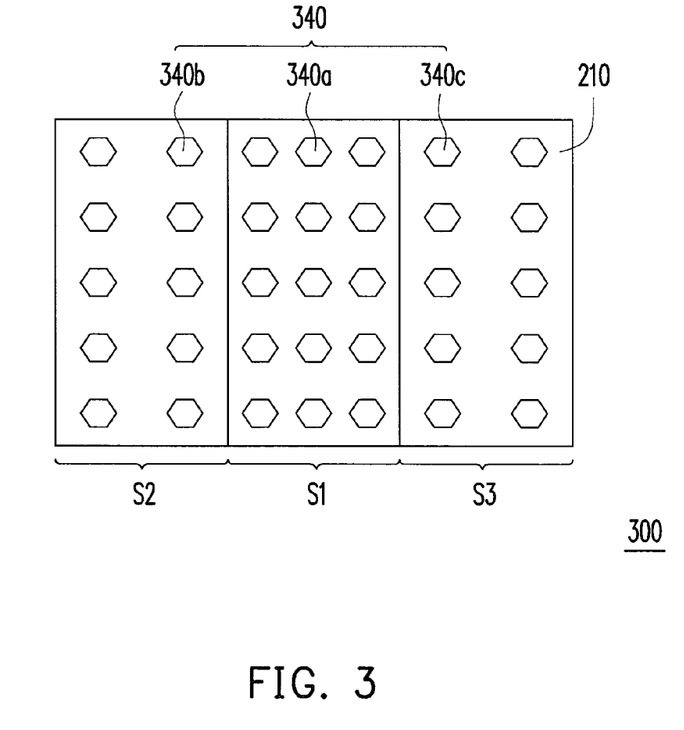
FIG. 3 is a top view of a cambered LCD panel according to another embodiment of the present invention.

FIG. 3 is a top view of a cambered LCD panel according to another embodiment of the present invention. Referring to FIG. 3 and FIG. 2D, the cambered LCD panel 300 of the present embodiment is similar to the cambered LCD panel 200, and a difference there between is that in the cambered LCD panel 300 of the present embodiment, a distribution density of a part of photo-spacers 340 close to the top A of the cambered structure is relatively great, and a distribution density of a part of the photo-spacers 340 apart from the top A of the cambered structure is relatively small. In detail, in the present embodiment, a distribution density of a plurality of first photo-spacers 340a configured in the first region S1 is D1, and a distribution density of a plurality of second photo-spacers 340b configured in the second region S2 is D2, wherein |D1/D2| is between about 1.125-about 20, and preferably |D1/D2| is between about 4-about 12.

It should be noticed that when a number of the second region S2 is multiple, in the second region S2 close to the first region S1, the distribution density D2 of the second photo-spacers 340b is relatively high. Conversely, in the second region S2 apart from the first region S1, the distribution density D2 of the second photo-spacers 340b is relatively small.

In the present embodiment, a distribution density of a plurality of third photo-spacers 340c configured in the third region S3 is D3, wherein D1>D3. Moreover, |D1/D3| is between about 1.125-about 20, and preferably |D1/D2| is between about 4-about 12. When a number of the third region S3 is multiple, in the third region S3 close to the first region S1, the distribution density D3 of the third photo-spacers 340c is relatively high. Conversely, in the third region S3 apart from the first region S1, the distribution density D3 of the third photo-spacers 340c is relatively small.

When the cambered LCD panel 300 is bent to form at least one cambered structure, since the distribution density of a part of the photo-spacers 340 close to the top A of the cambered structure is relatively high, it can first confront the cell gap variation of a region around the top A of the cambered structure, so as to maintain a consistency of the cell gap of the cambered LCD panel 300.

In summary, by adjusting the gaps between the photo-spacers and the opposite substrate or adjusting the distribution density of the photo-spacers, a gap between the photo-spacers close to the top of the cambered structure and the opposite substrate is adjusted to be smaller than a gap between the photo-spacers apart from the top of the cambered structure and the opposite substrate, or a distribution density of the photo-spacers close to the top of the cambered structure is adjusted to be higher than a distribution density of the photo-spacers apart from the top of the cambered structure, so as to maintain the cell gap of the cambered LCD panel. Moreover, bending patterns and a number of the tops of the cambered structure are not limited by the present invention, so that the cambered LCD panel of the present invention can be easily applied to different terminal products having different shapes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cambered liquid crystal display (LCD) panel, comprising:
   a first substrate;
   a second substrate;
   a sealant disposed between the first substrate and the second substrate, wherein the first substrate, the second substrate, and the sealant are bent to form a cambered structure, and the first substrate has a first region corresponding to the top of the cambered structure and at least a second region located at one side of the first region;
   a plurality of photo-spacers disposed on the first substrate and distributed between the first and the second substrate, wherein the photo-spacers comprise:
      a plurality of first photo-spacers disposed in the first region, wherein a height of each of the first photo-spacers is H1, and a gap between each of the first photo-spacers and the second substrate being G1; and
      a plurality of second photo-spacers disposed in the second region, wherein a height of each of the second photo-spacers is H2, and H1>H2, and a gap between each of the second photo-spacers and the second substrate being G2, wherein G1<G2; and
   a liquid crystal layer disposed between the first substrate and the second substrate, wherein the photo-spacers and the liquid crystal layer are surrounded by the sealant.

2. The cambered LCD panel of claim 1, wherein the first substrate has a pair of first long sides and a pair of first short sides, and the second substrate has a pair of second long sides and a pair of second short sides.

3. The cambered LCD panel of claim 2, wherein the pair of first long sides and the pair of second long sides are arc-shaped, and the pair of first short sides and the pair of second short sides are linear.

4. The cambered LCD panel of claim 2, wherein the pair of first long sides and the pair of second long sides are linear, and the pair of first short sides and the pair of second short sides are arc-shaped.

5. The cambered LCD panel of claim 1, wherein an absolute value of a difference between G1 and G2 ranges from about 0.15 micrometer to about 8 micrometers.

6. The cambered LCD panel of claim 1, wherein an absolute value of a difference between H1 and H2 ranges from about 0.15 to about 8 micrometers.

7. The cambered LCD panel of claim 1, wherein the first substrate further has at least one third region located at another side of the first region, and the photo-spacers further comprise a plurality of third photo-spacers disposed in the third region, and a gap between each of the third photo-spacers and the second substrate is G3, wherein G1<G3.

8. The cambered LCD panel of claim 7, wherein an absolute value of a difference between G1 and G3 ranges from about 0.15 to about 8 micrometers.

9. The cambered LCD panel of claim 7, wherein a height of each of the first photo-spacers is H1, and a height of each of the third photo-spacers is H3, and H1>H3.

10. The cambered LCD panel of claim 9, wherein an absolute value of a difference between H1 and H3 ranges from about 0.15 to about 8 micrometers.

11. The cambered LCD panel of claim 1, wherein a gap between the first substrate and the second substrate ranges from about 2 to about 6 micrometers.

12. The cambered LCD panel of claim 1, wherein a gap between the first substrate and the second substrate ranges from about 3 to about 5 micrometers.

13. The cambered LCD panel of claim 1, wherein the first substrate is a color filter substrate, and the second substrate is a transistor array substrate.

* * * * *